United States Patent
Brickner et al.

(10) Patent No.: US 11,627,373 B2
(45) Date of Patent: Apr. 11, 2023

(54) SYSTEMS AND METHODS FOR PROVIDING SURVEY DATA FROM A MOBILE DEVICE

(71) Applicant: Mercury Analytics, LLC, Washington, DC (US)

(72) Inventors: Scott Brickner, Washington, DC (US); Matthew Thomas Williams, Reston, VA (US); Peter Viss, Bethesda, MD (US); Ivan Vican, Imotski (HR)

(73) Assignee: Mercury Analytics, LLC, Washington, DC (US)

( * ) Notice: Subject to any disclaimer, the term of this patent is extended or adjusted under 35 U.S.C. 154(b) by 0 days.

(21) Appl. No.: 17/695,359

(22) Filed: Mar. 15, 2022

(65) Prior Publication Data

US 2022/0210507 A1 Jun. 30, 2022

Related U.S. Application Data

(63) Continuation of application No. 16/876,914, filed on May 18, 2020, now Pat. No. 11,277,663.

(51) Int. Cl.
*H04N 21/442* (2011.01)
*H04N 21/4415* (2011.01)
*G10L 21/0232* (2013.01)
*G10L 25/51* (2013.01)

(52) U.S. Cl.
CPC ... *H04N 21/44213* (2013.01); *G10L 21/0232* (2013.01); *G10L 25/51* (2013.01); *H04N 21/4415* (2013.01)

(58) Field of Classification Search
CPC .......... H04N 21/42203; H04N 21/439; H04N 21/4223; H04N 21/4788; H04N 21/4126; H04N 21/4307; H04N 21/4302; H04N 21/4394

See application file for complete search history.

(56) References Cited

U.S. PATENT DOCUMENTS

| | | |
|---|---|---|
| 7,797,186 B2 | 9/2010 | Dybus |
| 8,621,502 B2 | 12/2013 | Cronin |
| 8,677,006 B2 | 3/2014 | Brenes |
| 8,832,284 B1 | 9/2014 | Owens |
| 10,225,608 B2 | 3/2019 | Shigeta |
| 10,325,591 B1 | 6/2019 | Pogue et al. |
| 10,536,542 B1 | 1/2020 | Domer |
| 10,638,197 B2 | 4/2020 | Bist |
| 10,715,881 B2 | 7/2020 | Qu |
| 10,820,060 B1 | 10/2020 | Bosworth |
| 2007/0107008 A1* | 5/2007 | Dybus ................ H04N 21/4667 725/35 |
| 2009/0094286 A1 | 4/2009 | Lee |

(Continued)

*Primary Examiner* — Jason Salce

(57) ABSTRACT

A method includes receiving, at a mobile device, survey data comprising real-time survey user input associated with watching a video program and survey audio from the video program, the survey audio being recorded via a microphone of the user mobile device during the real-time survey, transmitting, to a network server, the survey data as part of a data package, wherein the network server receives an audio file associated with the video program, compares the audio file with the survey audio to yield a comparison and aligns, based on the comparison, the survey audio with the audio file to yield a modified data package and receiving a confirmation of a creation of the modified data package.

19 Claims, 6 Drawing Sheets

(56) References Cited

U.S. PATENT DOCUMENTS

| | | |
|---|---|---|
| 2009/0251599 A1 | 10/2009 | Kashyap |
| 2012/0017242 A1 | 1/2012 | Newell |
| 2012/0189140 A1 | 7/2012 | Hughes |
| 2012/0284419 A1 | 11/2012 | Brenes |
| 2012/0296972 A1 | 11/2012 | Backer |
| 2013/0014153 A1 | 1/2013 | Bhatia et al. |
| 2013/0145390 A1 | 6/2013 | Sillerman |
| 2016/0007083 A1 | 1/2016 | Gurha |
| 2017/0178692 A1 | 6/2017 | Wouhaybi |
| 2017/0214972 A1 | 7/2017 | Norhammar |
| 2017/0374414 A1* | 12/2017 | Knox ............... H04N 21/41407 |
| 2018/0234738 A1 | 8/2018 | Sarkar |
| 2019/0166403 A1 | 5/2019 | Yelton |
| 2019/0174193 A1 | 6/2019 | Wirasinghe |

* cited by examiner

SYSTEMS AND METHODS FOR PROVIDING SURVEY DATA FROM A MOBILE DEVICE

PRIORITY INFORMATION

The present application is a continuation of U.S. patent application Ser. No. 16/876,914, filed May 18, 2020, the content of which is incorporated herein by reference in their entirety.

TECHNICAL FIELD

The present disclosure generally relates to surveys and introduces a new technology that enables the processing of survey data from a user watching a video program and providing the survey data on a user mobile device.

INTRODUCTION

Surveys provide valuable research on human subjects. A survey is a list of questions aimed at extracting specific data from a particular group of people. Surveys can often occur for viewers of videos like movies or advertisements. Surveys are used to increase knowledge in fields such as social research, demography and politics.

Survey research is often used to assess thoughts, opinions, and feelings. A survey consists of a predetermined set of questions that is given to a sample. With video surveys, users can provide real-time input regarding how they are responding to the video moment-by-moment. Typically this type of survey requires a user to come to a survey facility. The survey facility provides the proper equipment to the user. For example, the user can be given a hand-held device that has buttons or other input mechanisms that the user can interact with to provide feedback while watching a video. The reason the user goes to a special facility is that the equipment is configured to synchronize the user input to the exact corresponding moment of a video program that the user is watching. This current process of obtaining survey data for videos with moment-by-moment input is expensive and cumbersome and requires users to come to a facility in order to use the proper equipment.

BRIEF SUMMARY

What is needed in the above-described survey environment is a technical improvement to how users can provide survey data while watching a video. A person taking a moment-by-moment survey, when using the technology disclosed herein, no longer needs to use specialized equipment to take a video-based survey or to go to a specific location. The disclosed solution introduces technology which enables a person to take a moment-by-moment survey of a video they are watching using their own mobile device, such as a smartphone. For example, a person could be in their own home, rather than at a survey facility, and choose to take a survey of a commercial or a TV program. The user can access a user interface on their personal mobile device. The user could access an application or website that presents a user interface enabling the user to provide moment-by-moment feedback of the program.

The challenge of using a personal smartphone to take a survey of a video that the user is watching is how to synchronize the survey data with the video. With satellite or cable television, there is always a lag or network delay between broadcast and the actual display of the video. That delay can vary for individual home devices. Thus, if a user has their iPhone with a user interface presented that enables them to take a survey or to receive their impressions while they watch a video, even a 1 second or ½ second mismatch between their impression and the video they are watching can destroy the validity of the survey. There would be no easy mechanism of synchronizing the video with the survey data provided by the user.

The solution disclosed herein introduced new technologies to enable the necessary synchronization. The mobile device of the user can be authorized, either manually or automatically, to record the audio portion of the video that the user is watching. The recorded audio can be characterized as a "fingerprint" of the audio in the room. A user sitting in a living room with a mobile device would authorize the device to record the audio in the room. A television set playing the video can include an audio portion that is recorded by the mobile device. The audio is recorded and the survey is taken using the mobile device. The mobile device generates a data package of the received audio correlated to the user survey input. As the survey is finished, the package of data is transmitted to a network-based server. The data package includes the survey moment-by-moment impressions or input of the user, and the audio from the video program. The survey data is at least synchronized with the received audio on the mobile device.

Next, the network server will receive the full audio from the video presentation. This can occur at the conclusion of a live video program or can occur prior to the presentation of a recorded video program, such as a YouTube video. The network server will the align the survey information received in the package of data with the full audio from the video presentation such that it can output an accurate representation of the survey data synchronized moment-by-moment with the video program. The alignment can occur by analyzing the recorded audio from the mobile device and comparing the recorded audio with the full audio or correct audio from the video presentation and adjusting in time the data in the package of data.

Often, the network server will receive many data packages from many mobile devices used to take a survey. The network server can align all of the various data packages and then process the output, aggregate the output and/or enable users to have access to the aggregated data. Without the alignment of the various data packages, the data would be worthless as it would not provide an accurate indication of a user's input with a particular moment in a video.

In one aspect, a mobile device such as an electronic watch can be configured to obtain biometric readings and the survey can occur based upon biometric readings while the user watches a video program. Wi-Fi, Bluetooth, cellular, 5G, or other wireless protocols can be implemented to communicate with a user mobile device to perform the steps disclosed herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Figure 1:
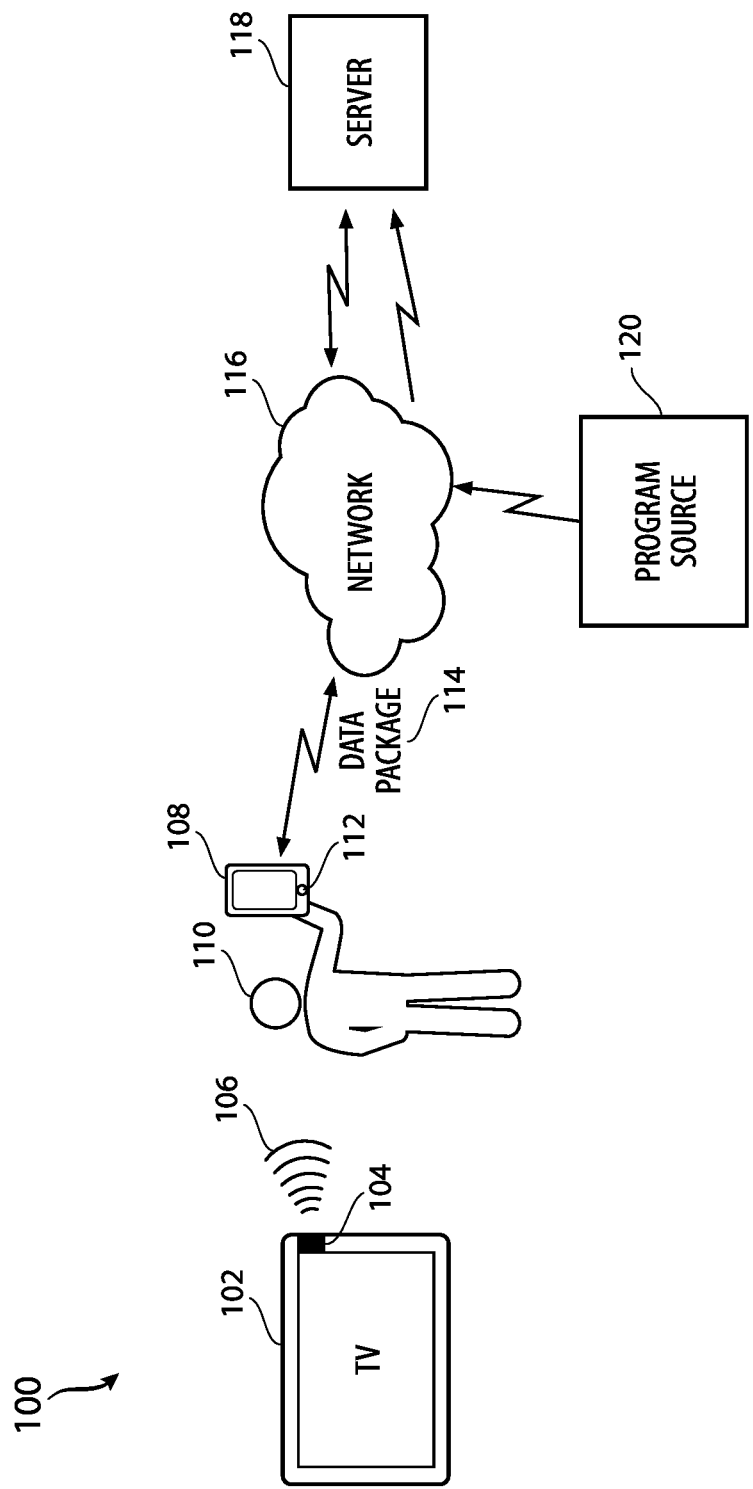
FIG. 1 illustrates an example system for providing a new technical environment to receive survey data.

Disclosed herein is an improvement to survey technology that enables users in their own homes to take surveys of moment-by-moment impressions of video programs (movies, commercials, YouTube videos, etc.). The new technology eliminates the need of survey takers to use specialized equipment for providing user input at special locations in which a video program is presented and their moment-by-moment survey user input is received via a specialized input device in a synchronized manner with the video program. FIG. 1 illustrates the new configuration 100 including a television set 102 having a speaker 104 that produces audio signals 106, a user 110 with a mobile device 108 which is configured with a microphone 112, a network such as the Internet 110 and a network-based server 118. A separate program source 120 is also provided. Of course the device 102 can represent any display device, such as computer, projector, a screen upon which a projected video is presented, and so forth.

The mobile device 108 could create audio fingerprints from the received ambient sound in the room. The received ambient sound is transmitted to servers 118 along with the rating data. The server 118 applies an algorithm to compare the audio fingerprints to audio fingerprints generated for the source video 120. In this manner, the precise moment when the user was synchronized with the broadcast or live event can be determined and the user survey data can be perfectly matched to the source video.

As noted above, when the specialized survey equipment is replaced with a user's personal mobile device 108, an additional technical problem exists when using the mobile device 108 to provide survey input moment-by-moment. Unlike the specific survey environment, there is no mechanism to match or align the video program presented on a TV 102 with the user's input on their mobile device. Absent some additional technology, the mobile device would just record user impression in time with no reference to the video program or a particular location in the video program that would correspond to a good or bad impression.

The new configuration operates as follows. Assume that the user 110 is going to participate in the survey of the evening news on channel 4. The user can be registered with a server 118 or any other manner prepare to watch the news at 6:00 PM and participate in a survey using their mobile device 108. The user can either download an application or preferably utilize a website hosted by the server 118. The website can be a progressive web app which provides a user interface which is similar in nature to a downloaded application interface. The user can access to website from the server 118 which can provide instructions as well as a user interface over the network 116. While the user watches the news on their television 102, the user would provide their impressions (like, don't like, love, etc.) on the user interface of their mobile device 108.

The new technology addresses the weaknesses in previous technical approaches to obtaining moment-by-moment survey data by introduced a solution that enables a much less expensive and convenient survey approach. Users can take a survey using one or more of their own mobile devices in their own home watching a video program on any device. The concepts disclosed herein coordinate multiple device such as the display device 102, the user's personal mobile device 108 (other devices such as an Apple Watch, for example), and a network-based server 118, to obtain audio data and survey data, perform a synchronization operation, and generate visual output based on the results of the synchronization.

Figure 2:
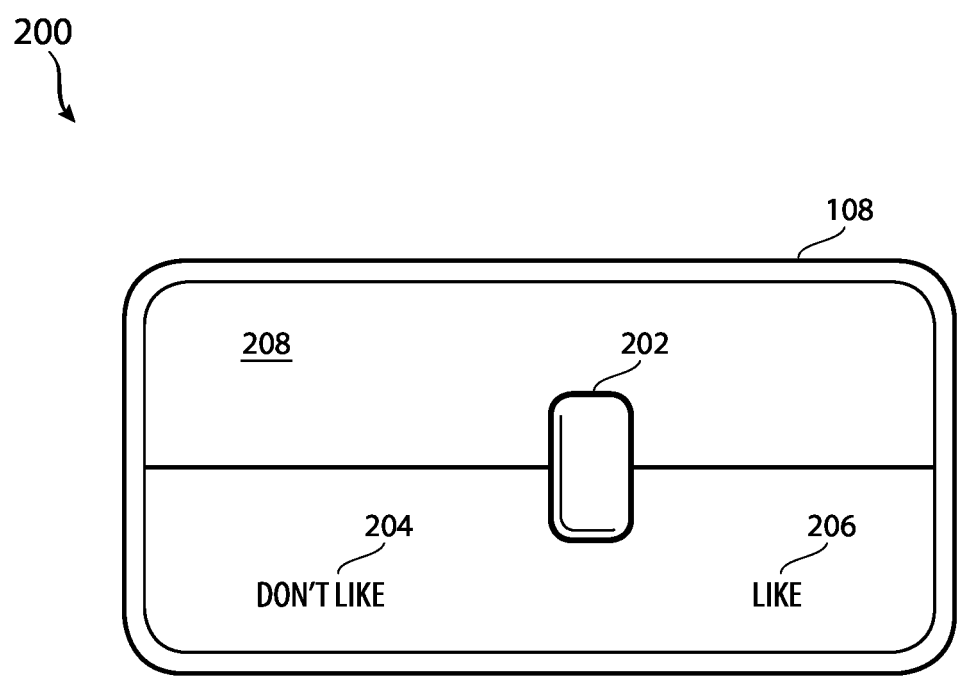
FIG. 2 illustrates a user interface provided for taking a survey on a user's mobile device.

As noted above, the user taking the survey can be instructed to turn to channel number 4 and watch the news program at 6:00 PM. FIG. 2 presents a user interface 208 on the mobile device 108 with a sliding bar 202 that the user can interact with to show that they either don't like 204 or do like 206 what they are seeing. The user will provide survey input moment-by-moment as they are watching the program. This information can be valuable to survey takers and to those presenting the video program regarding what words, stories, facial expressions and so forth made impressions upon the user as positive or negative.

The survey interface presented in FIG. 2 is an illustration only. There are many different ways to configure surveys and the particular approach disclosed herein is not meant to be limiting. The general principle that is applied is that a survey receives user input on a moment-by-moment basis while they are watching a video program on a display 102. The type of survey input can vary and the mechanism by which users provide the user input can also vary as well. For example, the user might provide biometric input such as a heart rate. The user may provide gesture input such as a hand motion or a user positioned within a room relative to a TV or display 102. The user may provide speech input. Any type of user input and any type of survey can be considered as within the scope of this disclosure. The resulting user survey data can vary in its meaning based on the configuration of the survey. However, for purposes of this disclosure, the survey data will be moment-by-moment and provided with respect to a video program. For example the survey data might be a likelihood that the user would buy a product, or whether they liked or disliked a political commercial, or whether they agree or disagree with points being made in a program.

The website 118 or an application can provide the user interface 208. In one aspect, the user interface 208 can request authorization for access to the microphone 112 on the mobile device 108. The authorization can be provided in any number of ways such as the user clicking on an object presented on the display or through a speech authorization and so forth. Assuming that the authorization is granted to access the microphone 102 of the mobile device 108, the mobile device will present the user interface 208 with instructions to begin the survey and the microphone 112 will record of the audio signal 106 received from the speaker 104 associated with the display device 102.

The mobile device 108 will record the moment-by-moment user survey input as well as the audio 106 received from the TV 102. As noted above, given the lag or latency in the transition of the video program to the device 102, there is a need for the audio 106 to be recorded by the device 108 in order to identify or align the moment-by-moment survey user information with the exact timing in the video program. Even a small variation in the user survey data relative to the video program can destroy the efficacy of the survey. In one aspect, the device 108 will store the user survey data, timestamps, and the program audio 106 received via the microphone 112 of the mobile device 108. The device 108 can create a data package that includes all of this information and can transmit that data package to the server 118 at the conclusion of the survey. In another aspect, the user device 108 can stream the audio information 106 and survey data to the server 118.

The server 118 receives the necessary data, in one manner or another, such that it has the user survey information on a moment-by-moment basis and the associated audio that is recorded by the device 108. Next, there is a necessity to identify or to align the survey data with the video program. The data package has the received audio aligned with the survey data but the system does not know how the audio is aligned with the actual video program. The solution for accomplishing this alignment is presented next.

Figure 3:
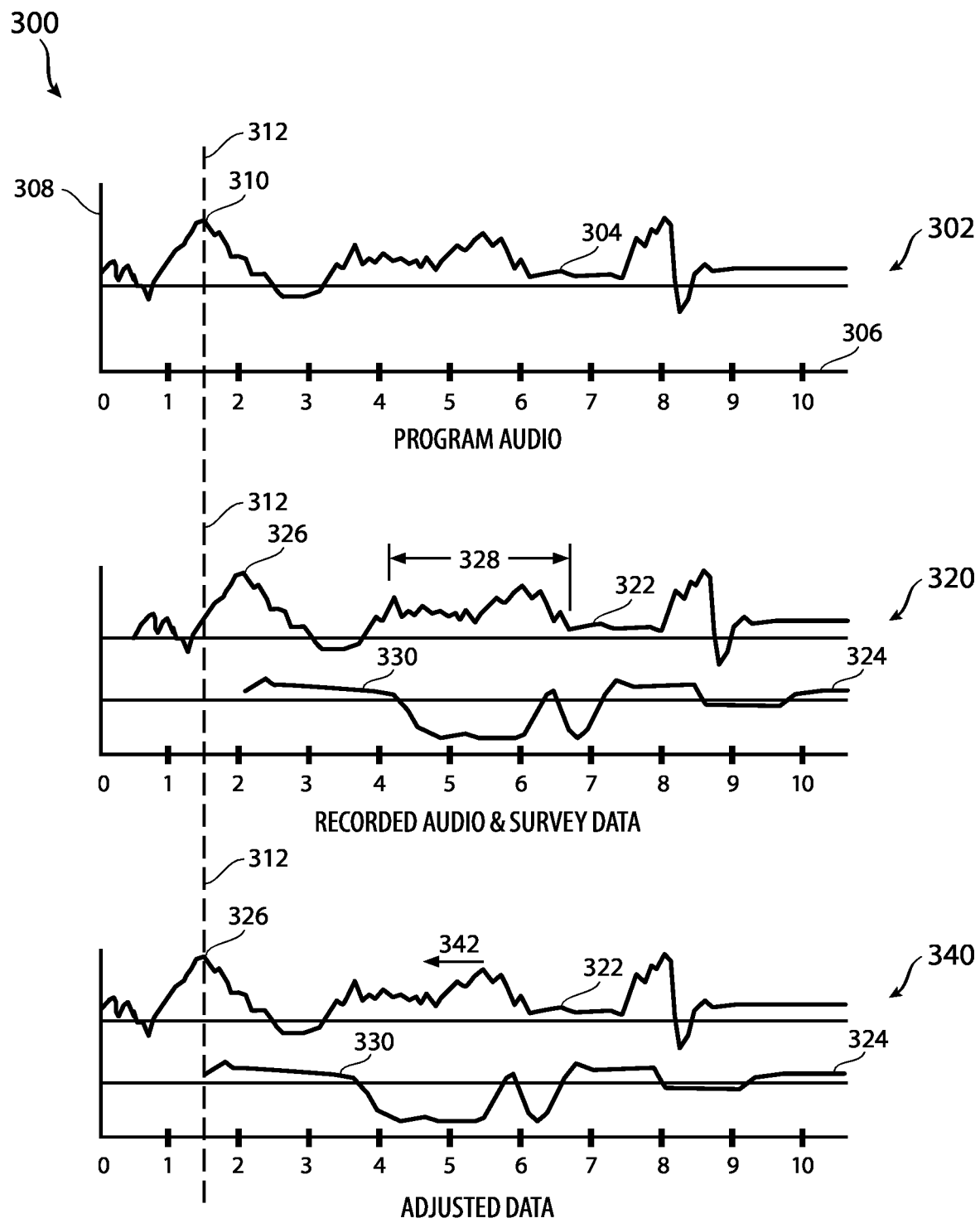
FIG. 3 illustrates at signal processing and aligning of various audio tracks for survey data.

FIG. 3 illustrate several graphs 300 which show how this alignment occurs. The first graph 302 represents the actual audio for the video program. In other words, this is the audio as it was presented by the device 102, not the audio as it was received by the microphone 112 on device 108. The actual audio to the video program can be provided, for example, by a program source 120. After the live broadcast of the news, a recording of the live broadcast can be provided to the server 118 for purposes of alignment of the survey data. The full audio or correct audio can be received by the server and processed in preparation for analysis or comparison with the audio received by the mobile device 108.

As can be seen in FIG. 3, the graph 302 includes the audio data 304, an alignment line 312 and a representative peak 310. The vertical axis 308 can represent a volume, frequency, decibel reading or any other characteristic of the audio. The horizontal axis can be represented in time.

FIG. 3 also illustrates another graph 320 which represents the data package recorded on the device 108. Data 322 represents the audio that is recorded by the microphone 112 on the device 108. Data 324 represents the input provided via the user interface 208 by the user. The data 324 can represent positive feelings and negative feelings on a moment-by-moment basis relative to the audio of the video program 322. Note that peak 326 is an approximately 2 seconds while peak 310 is at approximately 1.5 seconds in graph 302. The alignment line 312 illustrates how there can be a delay in the broadcast of the program from the device 102.

This disclosure also notes that the audio 322 can include other noises within the environment where the user 110 is watching the video program. The user may speak, a telephone may wring, other people in the room might be talking, and so forth. Accordingly, the audio 322 is likely not clean or representative of the audio associated with the video program 304. The system may analyze the audio 304 and the audio 322 to perform a comparison of the two data sets. The analysis could include an identification of extraneous or differences in the audio 322 as it may include other noises while audio 304 would be a "clean" representation of the presented video program.

The server 118 will align the data 304 from graph 302 with the data 322 from graph 320 in order to match the user survey data 324 and known positions moment-by-moment in the video program. For example, a comparison of position 310 and position 326 can provide confirmation of the offset necessary to identify which moment in time in the video program corresponds to user survey input at point 330. The system 118 can output a time adjusted set of data which accurately synchronizes the user survey input to the video program on a moment-by-moment basis.

With the proper alignment of the survey data timeline with the video program timeline, the system 118 can provide users with an improved graphical experience when evaluating the data. For example, an interface can be presented in which the user could pick a point (like point 330) on the survey data and have a corresponding image from the video program presented. The person can see exactly what was being viewed that caused the survey reaction.

The system can receive multiple sets of data for user surveys from many users. Given the accurate audio data 304 for the video program, the system 118 can synchronize two or more different data sets, each respective data set can be from a different user survey. The system 118 can then aggregate the accurate data to provide insight into user reaction to the video program, moment-by-moment. The aggregated data could also present groupings such as by age, gender, political party, income, geographic location, etc.

It is noted that the user may perform a survey through only a portion of the video program. Feature 328 can represent a scenario where the user watched only a portion of the video program and provided survey data for that portion. The system 118 can receive the record audio 106 and the associated survey data 324 for that portion of the video program. In the alignment and synchronization process, the system 118 can identify which portion of the video program was actually surveyed by comparing the record audio portion 328 to the entire audio signature 304 of the video program to identify where the match is. The system may or may not include the survey information from a portion of the video program in aggregated results. In one aspect, because the survey information is only for a portion 328 of the video program, those results might be discarded. In another aspect, the system might incorporate survey data covering only a portion of the video program into a larger aggregated data set the video program.

FIG. 3 illustrates one data set 320 from a single user survey. However, dataset 320 can represent multiple data sets each of which can be adjusted in time to be synchronized with the program audio 302.

Graph 340 of FIG. 3 represents the shifting 342 of the audio data 322 and the survey data 324 together to alight the audio data 322 with the actual program audio 304. The leftward shift 342 is shown to be approximately ½ second. Note that this aligns the point 326 of the audio data 322 with the peak 310 of the actual program audio 304. With the alignment of this data, the system 118 can now be confident that the survey data 324 properly corresponds on a timing basis with the program audio 322.

Figure 4:
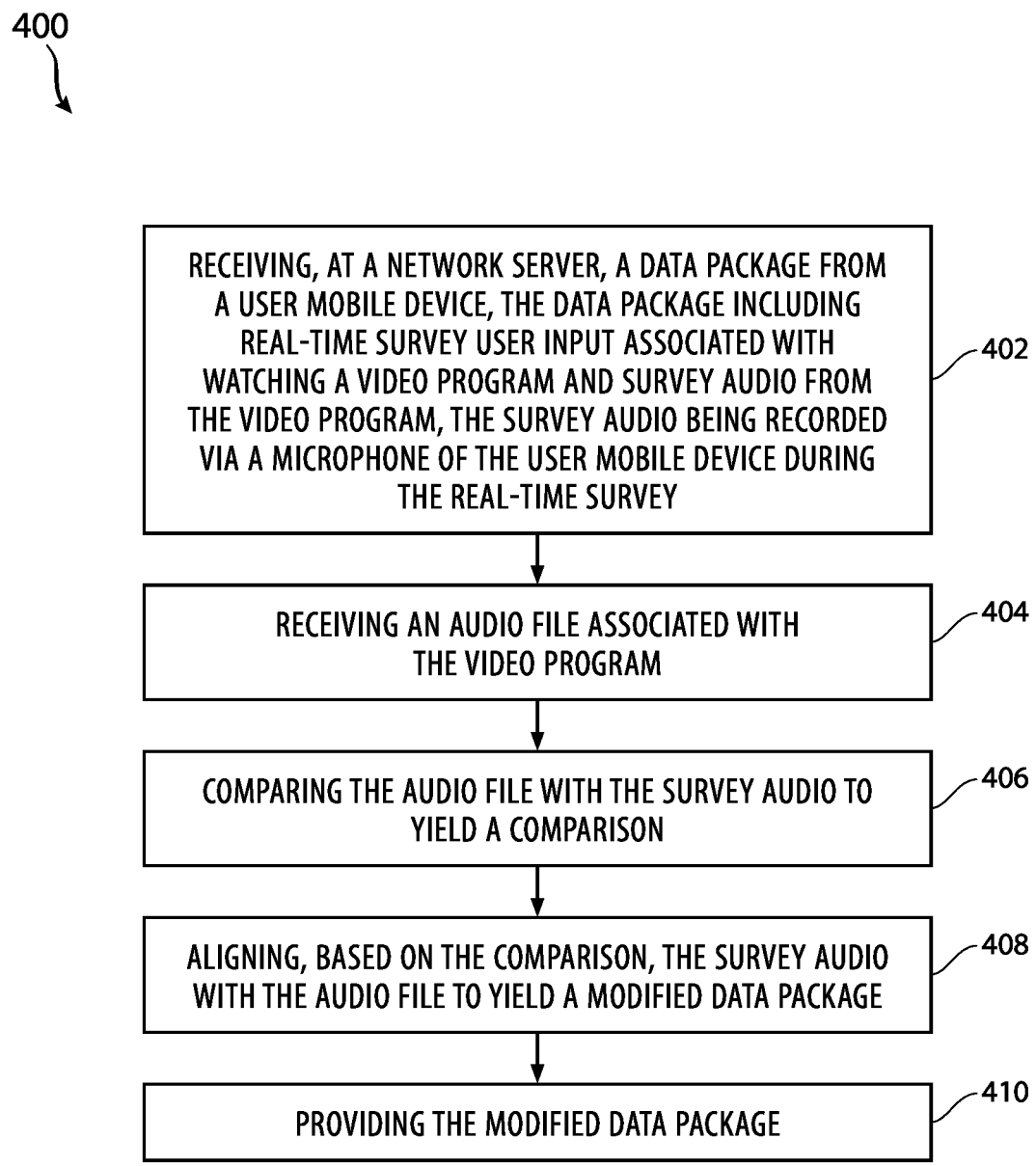
FIG. 4 illustrates a method embodiment.

FIG. 4 illustrates a method example from the standpoint of the server 118 performing a series of operations to process the audio it receives. The method can include one or more of the following steps, in any order. The method can include receiving, at a network server, a data package from a user mobile device, the data package including real-time survey user input associated with watching a video program and survey audio from the video program, the survey audio being recorded via a microphone of the user mobile device during the real-time survey (402), receiving an audio file associated with the video program (404), comparing the audio file with the survey audio to yield a comparison (406) and aligning, based on the comparison, the survey audio with the audio file to yield an modified data package (408). The fingerprint from these various one or more audio files are compared and analyzed to align the received fingerprint with the audio of the media program. The system can also provide the modified data package (410) in any form for review, display and analysis.

The method can further include receiving a second data package from a second user mobile device, the second data package having second survey audio, comparing the audio file with the second survey audio to yield a second comparison and aligning, based on the second comparison, the second survey audio with the audio file to yield a second modified data package. In one aspect, the system can aggregate the modified data package and the second modified data package to yield aggregated data and provide the aggregated output to users in any fashion such as via a graphical display or database.

In another aspect, the method can include comparing one or more additional survey audio from other user mobile devices, aligning each additional survey audio with the audio file to yield additional modified data packages and generating an aggregated data file of multiple surveys, each survey of the multiple surveys having its respective survey audio aligned with the audio file. The method can include determining whether extraneous audio exists in the survey audio based at least in part on the comparison to the audio file and filtering out the extraneous audio, if any, in the survey audio, to yield filtered survey audio. For example, the sound of the video program being rated in the individual's room will likely include other sounds such as echo or the sound may be of low quality, with distractions such as people talking, phones ringing and dogs barking. The algorithm disclosed herein will filter such distractions out to find sufficient basis from which to match a very high percentage of individuals to the proper portion of the media that they rated. In one example, the algorithm can use the source audio from device 120 to evaluate differences in the audio file and the source audio to identify the extraneous sounds and over time or a window be able to filter out the extraneous sounds.

The filter can cover the situation where other audio is in the room but there is enough audio information in the data package for the server 118 to synchronize the survey data with the audio of the video program. When the survey audio is filtered, the step of comparing the audio file with the survey audio can utilize the filtered survey audio in place of the survey audio. The real-time survey user input can include one or more of touch screen input, gesture input, speech input, gyroscope input, volume input, multi-modal input, and biometric input. The system can also coordinate input from other devices such as a watch that can capture biometric input such as a heartbeat or skin temperature. The data package can include time stamps used to align the real-time survey user input to the survey audio.

As noted above, the survey audio may cover only a portion 328 of the video program. In that situation, the method can modify the comparing step such that the step of comparing the audio file with the survey audio further includes identifying the portion of the video program covered by the survey audio. If the survey only covers a portion of the video program, that survey may be removed form an aggregated data set or an aggregated data set can be labeled or identify that the portion of the aggregated data has more surveys associated with it. For example, the data plot 324 may be bolded in the region 328 illustrating that more users data is included in the aggregated data.

In one aspect, a mobile device such as an electronic watch can be configured to obtain biometric readings and the survey can occur based upon biometric readings while the user watches a video program. Wi-Fi, Bluetooth, cellular, 5G, or other wireless protocols can be implemented to communicate from an electronic watch with a user mobile device to perform the steps disclosed herein. In another aspect, the watch can communicate with a mobile device such as a phone to generate the survey data utilizing coordinate between several devices. The phone can take user input on a screen and the watch could provide biometric data, all in real time and each respective device recording the audio for synchronization as disclosed herein. Thus, multiple data sets from different devices can be combined, each data set with time stamps, to provide a more enhanced and more robust survey. For example, a watch can capture on a moment-by-moment basis biometric data (the watch also recording audio), and a mobile device may capture survey information moment-by-moment while recording audio of the video program. The watch may transmit its data to the mobile device via Bluetooth and the mobile device may generate a data package with the watch program audio, the watch biometric data, the mobile device program audio and the mobile device survey data. That data package is transmitted to the network server 118 which performs the alignments described herein for both the mobile device survey data and the watch biometric data.

In one aspect, the system may operate to determine that the proper alignment of the data has been achieved. If a threshold is not met (say a 85% confidence level), then the system can present data for manual labeling or manual synchronization. The system could, for example, play the ambient audio from the room and the source audio and ask a user to align audio segments shown on a graphical screen or to confirm that there is an alignment of the two audio tracks. Machine learning or artificial intelligence techniques or models can be used to identify or shift the ambient noise fingerprint with the actual audio of the video program.

Figure 5:
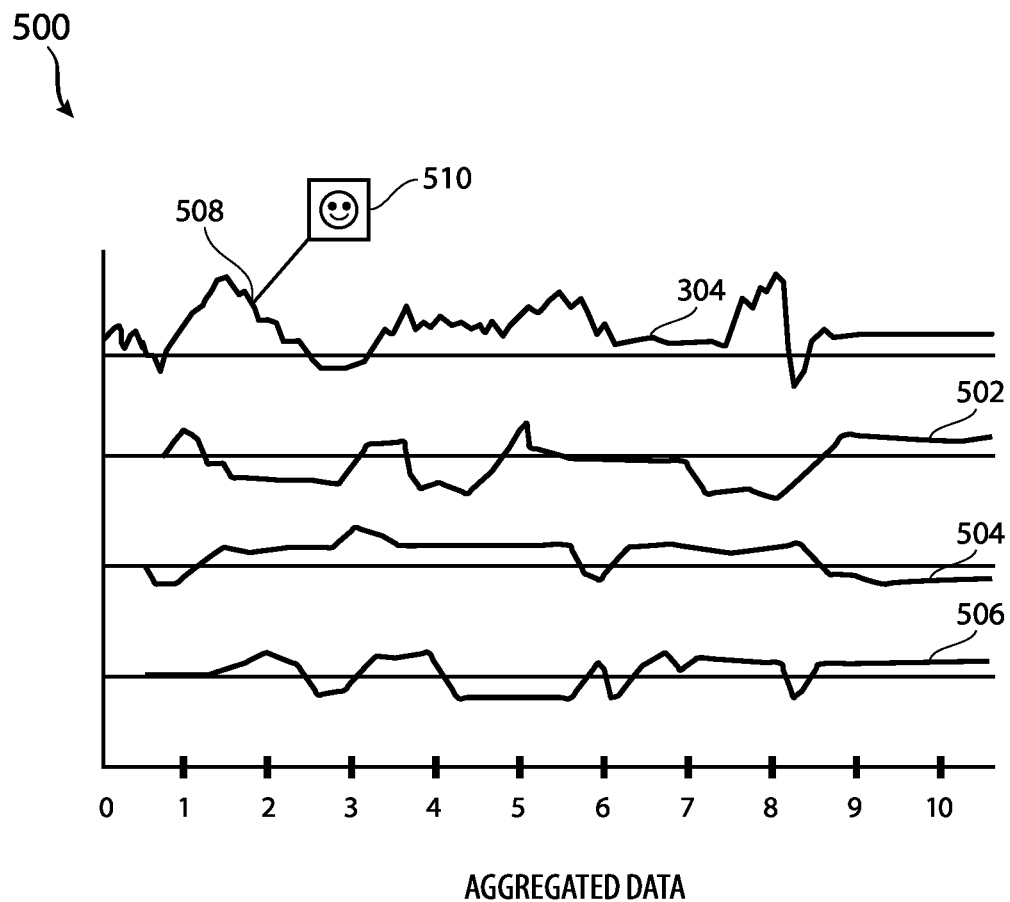
FIG. 5 illustrates aggregated survey data.

FIG. 5 illustrates a graph 500 representing a possible output display of aggregated data. For example, the data 304 can represent the video program. Screenshots 510, audio, or any other configuration can be used to show the video program moment-by-moment. In one aspect, a user could use a mouse pointer or touch sensitive screen to identify a portion 508 of the data 304 and the system could present a screenshot 510 that identifies the portion of the data that corresponds that spot. The user could also perform a similar action by clicking on the data 502, 504, 506. The data 502, 504, 506 can represent aggregated data from various groups. For example, data 502 could represent aggregated data from women and data 504 can represent data from men and data 506 could represent data from people in their 20's. One set of data 502 could represent a user's biometric data and another set 504 could represent the data input on their mobile device. The system can aggregate data from various people using the approach used above in which each user's data from their mobile device, which includes recorded audio and the survey data, can be aligned with the actual audio in whole or in part, and then combined with other data of individuals either similar to a respective person or other data for visual presentation.

Figure 6:
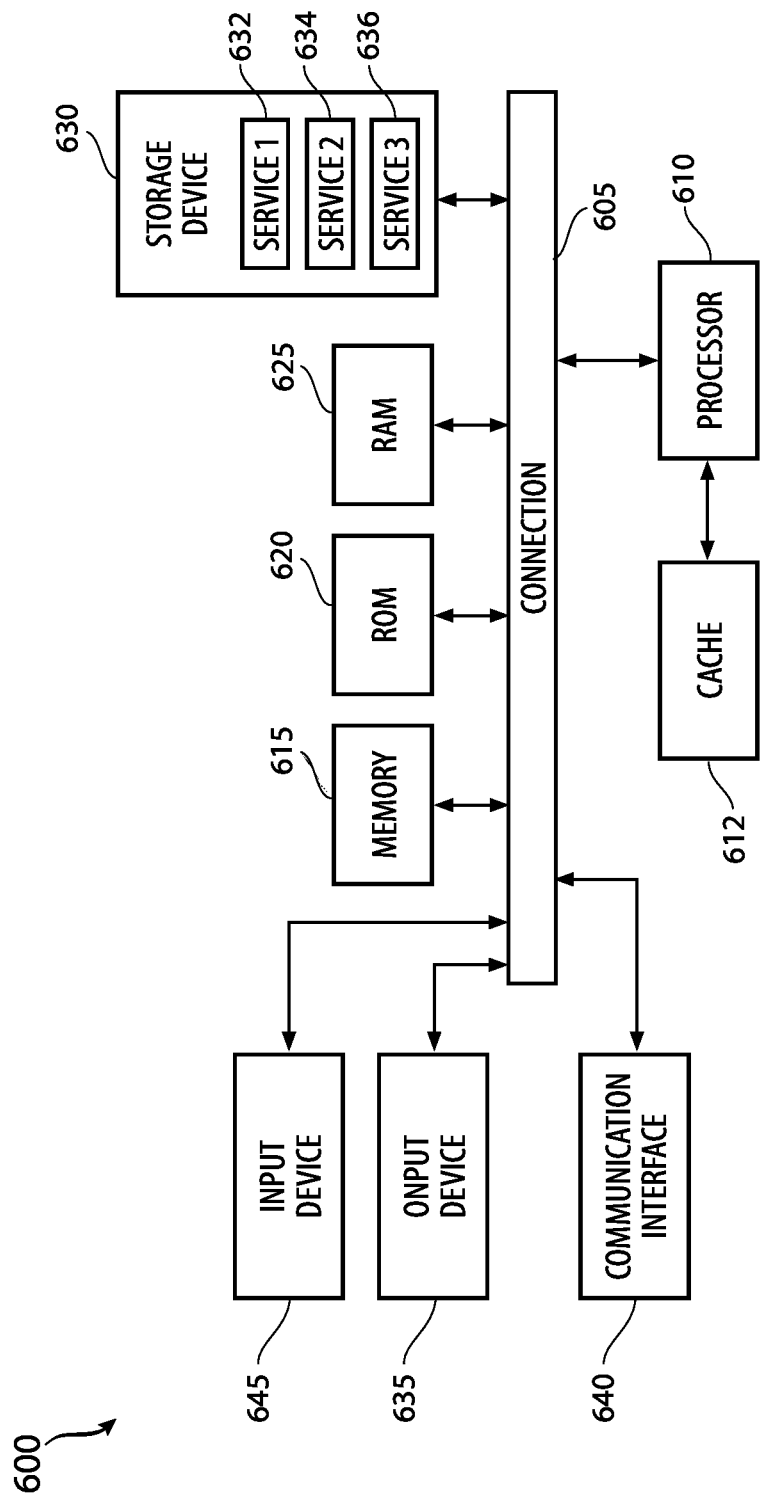
FIG. 6 illustrates an example system.

FIG. 6 illustrates an example computing system architecture of a system 600 which can be used to process data operations and requests, store data content and/or metadata, and perform other computing operations. In this example, the components of the system 600 are in electrical communication with each other using a connection 605, such as a bus. The system 600 includes a processing unit (CPU or processor) 610 and a connection 605 that couples various system components including a memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to cache 612 for quick access by the processor 610. In this way, the cache can provide a performance boost that avoids processor 610 delays while waiting for data. These and other modules can control or be configured to control the processor 610 to perform various actions. Other memory 615 may be available for use as well. The memory 615 can include multiple different types of memory with different performance characteristics. The processor 610 can include any general purpose processor and a hardware or software service, such as service 1 632, service 2634, and service 3636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof. The computer-readable medium may include memory or data storage media, such as non-volatile random access memory (NVRAM), electrically erasable programmable read-only memory (EEPROM), FLASH memory, magnetic or optical data storage media, and the like.

The storage device 630 can include services 632, 634, 636 for controlling the processor 610. Other hardware or software modules are contemplated. The storage device 630 can be connected to the connection 605. In one aspect, a hardware module that performs a particular function can include the software component stored in a computer-readable medium in connection with the necessary hardware components, such as the processor 610, connection 605, output device 635, and so forth, to carry out the function.

For clarity of explanation, in some instances the present technology may be presented as including individual functional blocks including functional blocks including devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. A computer system programmed with the algorithms disclosed herein or incorporated herein by reference are a special-purpose computer system according to Patent Office Guidance. The computer executable instructions may be, for example, binaries, intermediate format instructions such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
    receiving, at a mobile device, survey data comprising real-time survey user input associated with watching a video program, the video program comprising survey audio;
    recording the survey audio via a microphone of the user mobile device while playing the video program and during the real-time survey to generate recorded survey audio; and
    transmitting, to a network server, the survey data as part of a data package comprising the recorded survey audio, wherein the network server receives the recorded survey audio, compares the recorded survey audio with the survey audio to yield a comparison and aligns, based on the comparison, the survey audio with the recorded survey audio to yield a modified data package and wherein the network server receives a second data package from a second mobile device, the second data package having second recorded survey audio recorded when the second mobile device receives second survey data while the second mobile device plays the video program having the survey audio, compares the second recorded survey audio with the survey audio, to yield a second comparison and aligns, based on the second comparison, the survey audio with the second recorded survey audio to yield a second modified data package; and
    receiving a confirmation of a creation of the modified data package.

2. The method of claim 1, wherein the network server further aggregates the modified data package and the second modified data package to yield aggregated output and wherein the method further comprises:
    accessing the aggregated output from the network server.

3. The method of claim 1, wherein the network server further compares one or more additional recorded survey audio from other user mobile devices, aligns each additional recorded survey audio with the survey audio to yield additional modified data packages and generates an aggregated data file of multiple surveys, each survey of the multiple surveys having its respective recorded survey audio aligned with the survey audio.

4. The method of claim 1, wherein the network server further determines whether extraneous audio exists in the recorded survey audio based at least in part on the comparison to the survey audio.

5. The method of claim 4, wherein the network server further filters out the extraneous audio, if any, in the recorded survey audio, to yield filtered survey audio.

6. The method of claim 5, wherein the network server further, when the recorded survey audio is filtered, compares the recorded audio with the recorded survey audio utilizing the filtered survey audio in place of the recorded survey audio.

7. The method of claim 1, wherein the real-time survey user input comprises one or more of touch screen input, gesture input, speech input, gyroscope input, volume input, multi-modal input, and biometric input.

8. The method of claim 1, wherein the data package comprises time stamps aligning the real-time survey user input to the recorded survey audio.

9. The method of claim 1, wherein the recorded survey audio covers a portion of the video program.

10. The method of claim 9, wherein the network server compares the recorded audio with the recorded survey audio by identifying the portion of the video program covered by the recorded survey audio.

11. A system comprising:
    at least one processor; and
    a computer-readable medium storing instructions which, when executed by the at least one processor, cause the at least one processor to perform operations comprising:
        receiving survey data comprising real-time survey user input associated with a user watching, on the system, a video program having survey audio, the survey audio being recorded via a microphone of the system during the real-time survey to yield recorded survey audio; and transmitting, to a network server, the survey data as part of a data package, wherein the network server receives survey audio associated with the video program, compares the survey audio with the recorded survey audio to yield a comparison and aligns, based on the comparison, the recorded survey audio with the survey audio to yield a modified data package and wherein the network server receives a second data package from a second mobile device, the second data package having second recorded survey audio recorded when the second mobile device receives second survey data while the second mobile device plays the video program having the survey audio, compares the second recorded survey audio with the survey audio, to yield a second comparison and aligns, based on the second comparison, the survey audio with the second recorded survey audio to yield a second modified data package; and receiving, via a user interface on the system, further data regarding the modified data package.

12. The system of claim 11, wherein network server aggregates the modified data package and the second modified data package to yield aggregated output and wherein the computer-readable medium stores further instructions which, when executed by the at least one processor, cause the at least one processor to perform operations comprising accessing from the network server the aggregated output.

13. The system of claim 11, wherein network server compares one or more additional survey audio from other systems, aligns each additional recorded survey audio with the survey audio to yield additional modified data packages and generates an aggregated data file of multiple surveys, each survey of the multiple surveys having its respective recorded survey audio aligned with the survey audio.

14. The system of claim 11, wherein network server determines whether extraneous audio exists in the recorded survey audio based at least in part on the comparison to the survey audio.

15. The system of claim 14, wherein network server filters out the extraneous audio, if any, in the recorded survey audio, to yield filtered survey audio.

16. The system of claim 15, wherein, when the recorded survey audio is filtered, the network server compares the recorded survey audio with the survey audio utilizing the filtered survey audio in place of the recorded survey audio.

17. The system of claim 11, wherein the real-time survey user input comprises one or more of touch screen input, gesture input, speech input, gyroscope input, volume input, multi-modal input, and biometric input.

18. The system of claim 11, wherein the data package comprises time stamps aligning the real-time survey user input to the recorded survey audio.

19. A method comprising:

receiving, at a mobile device and via a graphical user interface configured on the mobile device, survey data comprising real-time survey user input associated with watching a video program having survey audio, the survey audio being recorded via a microphone of the user mobile device during the real-time survey to generate recorded survey audio; and transmitting, to a network server, the recorded survey data as part of a data package, wherein a program operating the graphical user interface enables the mobile device to coordinate with the network server that receives an audio file associated with the video program and having survey audio as part of the video program, compares the audio file with the recorded survey audio to yield a comparison and aligns, based on the comparison, the recorded survey audio with the audio file to yield a modified data package wherein the network server further receives a second data package from a second mobile device, the second data package having second recorded survey audio recorded when the second mobile device receives second survey data while the second mobile device plays the video program having the survey audio, compares the second recorded survey audio with the survey audio, to yield a second comparison and aligns, based on the second comparison, the survey audio with the second recorded survey audio to yield a second modified data package; and receiving, via the graphical user interface, further data regarding the modified data package.

\* \* \* \* \*